UNITED STATES PATENT OFFICE.

JAY W. SEAVER, OF NEW HAVEN, CONNECTICUT, ASSIGNOR TO NATHANIEL C. FOWLER, JR., OF BOSTON, MASSACHUSETTS.

FOOD COMPOSITION.

1,182,860.  Specification of Letters Patent.  Patented May 9, 1916.

No Drawing.  Application filed June 23, 1914. Serial No. 846,891.

*To all whom it may concern:*

Be it known that I, JAY W. SEAVER, a citizen of the United States, residing at New Haven, in the county of New Haven and State of Connecticut, have invented new and useful Improvements in Food Compositions, of which the following is a specification.

This invention relates to improvements in food compositions.

More particularly it relates to an improvement by which a culture medium, suitable both for human food and as a food medium to maintain the life and efficient vitality of certain beneficent bacteria, can be carried through certain parts of the human digestive tract while undigested, notwithstanding the contemporaneous continuance of the normal processes of human digestion, and with a profusion of the bacteria themselves present.

It has already been discovered, or at least facts have been observed which support the belief, that if certain processes of putrefaction of foods in the large intestine could be avoided the longevity of individuals and of the human race in general could be considerably extended. It is also known that such putrefaction can be prevented by the action of pepsin, which is usually present as a digestive fluid, but that pepsin will work only in an acid medium, and that, for that reason, it often does not perform its normal function. It is also known that certain forms of germ life, one of which is known as the *Bacillus Bulgaricus*, under favorable conditions will act upon lactose, the sugar of milk, so as to produce lactic acid which is normally a liquid. The taking of buttermilk in which this bacillus is supposed to be present has therefore been advised, and is practiced by many people; as is also the taking of germ bearing milk, prepared in commercial laboratories as cultures of the *Bacillus Bulgaricus* and sold to consumers under various trade names. None of these methods have proven as effective as has been hoped. I believe that one reason for this failure is that the bacilli in question mostly die before they reach the large intestine, because of failure of their food supply owing to the effect of the digestive processes that are acting upon them, and their food, during its delay in the stomach and passage through the thirty-two feet, more or less, of the small intestine; or at least that they fail to reach it in sufficient numbers and in sufficient vigor to produce the quantity of lactic acid that is needed.

It is the purpose of the present invention to provide a food composition containing acid producing germs and elements in combination therewith that will carry them and a sufficient food supply for them down into the large intestine in living and vigorous working condition, and thus to introduce them into the place where their product will make a suitable acid medium for the digestive ferments that are present to start and perfect their work, and so to perfect the digestion and stop the putrefaction of food in the large intestine.

While this fundamental idea of the invention may be carried out in various ways it is a particular purpose of the present invention to provide means by which it can be carried out naturally and inexpensively, and on what may be termed a food basis, rather than as a medicinal or laboratory or sanitarium treatment, and to this end the invention combines a medium for carrying and cultivating lactic acid producing germs or other suitable beneficent bacilli with other food ingredients which carry the carrier into the large intestine as above explained.

The object of the invention, to produce these results under circumstances which do not have the aspect of medicinal treatment, has both a commercial and an economic or humanitarian bearing, for if a composition can be found which is really palatable and economical and of good nutritive value, and which at the same time is strongly conducive to prevention of digestive troubles, and to the relieving of various tissues from deteriorating influences that are now common, and so is conducive to longevity, a great industry can be built up in the preparation of such food, and much good done by making it easy and natural for people at large to take the necessary steps of their own initiative in order to bring about the improved conditions in the large intestine and improved condition of general health described above, which, if prevailing extensively among the people would make a marked improvement in public health and in public efficiency. The establishment of such an industry on a commercial scale should furnish the necessary stimulus for the building up of a business organization that would teach people the benefits of the invention; while the practice of it by the people generally might conceivably add tremendously to the economic producing power of the nation, or of any people who in large numbers adopt the practice.

These objects of the invention are accomplished by the use of a certain recently discovered process in the preparation and preservation of foods, which is set forth more fully in an application for patent of Mr. Nathaniel C. Fowler, Jr., Serial No. 795,597, which sets forth a method of making a self-preserving food containing all the nutritive ingredients of fruit and grain without the use of any chemical or other added preservative ingredient, and without the aid of the previously known preservative methods of salting, sugaring, pickling, or drying in such manner that the food has to be soaked in water to be edible or palatable, and in the combination with this, of a suitable culture, preferably of lactic acid producing germs and preferably by means of the so-called artificial buttermilk combined with whole milk. The said food made according to the Fowler invention consists of fruit and grain, including bran, in the form of minute sterile particles, which particles being very finely comminuted and sterilized are dry to such a complete extent that practically all moisture is removed, so that germ life finds no support therein. In the course of manufacture the finely comminuted particles may, if desired, be incased in a glutinous product of the fruit component, and may preferably be so treated when the food has any component oils, as set forth in an application for patent Serial No. 846,889 of said Fowler, the result of which is to preserve the oily components from deterioration by contact with the air, and from becoming rancid; the particles being incased in the glutinous matter and that glutinous matter then hardened by the heat which is applied to drive off the moisture, while still remaining soluble and therefore easily edible and digestible. Such a sterile food contains all the nutriment of its grain and fruit components, and may be manufactured at whatever location in the country, and at whatever time of year, the fruit is available at minimum cost; and may be made with different fruits, of which prunes and apples will serve as illustrations, according to the section of the country or according to whatever crop is most abundant or least expensive. This vegetable food is self-preservative, and ready for immediate eating without further preparation. The lactic acid producing germs which are combined with it, according to the invention, are introduced in a powder, and fresh whole milk or cream is added. Ordinary buttermilk is a natural culture medium for such germs, but is not palatable to most people. Many of those who drink it do so by force of will, and from a sense of duty, rather than with a sense of pleasure; and this fact greatly restricts its use. The food of the present invention consists of the combination of the said sterile food composition with whole milk or cream and a body of material including live lactic acid producing germs. Such a combination is entirely palatable, so that the individual is not repelled but ordinarily feels attracted. When within the digestive tract, the bran of the combination so stimulates the peristaltic action of the small intestine, by the mechanical irritation which it causes, that the whole mass moves more rapidly through that intestine than is customary with foods, and so carries the corn and fruit carbo-hydrates rapidly through its tortuous length.

By reason of the very finely powdered state of the grain and fruit, and the intimate association and general mixture of the lactic acid producing germs with them in the food as eaten, and with the milk or cream taken with this food, these germs immediately begin their active life; and they continue their activity, and multiply, during the passage of the food through the digestive tract. The automatic rapidity of the passage through the small intestine delivers the food in the large intestine before the digestive processes have had time to exhaust the food supply of the germs, so that the production of lactic acid is still going on. The carrying through of the carbohydrates so rapidly permits a supply of other sugars as well as lactose, in the large intestine, so that it is probable that the growth and activity of other beneficent acid producing germs there present is stimulated, by the abundant supply of sugars on which they can live, provided there in the intestine by the breaking up of the starches or other carbohydrate elements in the food. The production of acid continues for a time, so long in fact as the supply of lactose and other foods for these lactic and other acid producing germs lasts, with a result that a sufficient quantity of the lactic acid is produced in the large intestine to provide an acid medium in which the pepsin that is there present can do its work with the other digestive agencies. Thus, by making the digestive process complete, the action of those germs is anticipated, which would otherwise begin their work of putrefaction upon the body of material present in the intestine. This is to be contrasted with the various prepared foods that have heretofore been proposed, in which easy and quick digestibility has been the object, which has resulted in the digestion and disappearance of a considerable proportion of the food at a relatively early stage in the process, accompanied incidentally by destruction and weakening of the lactic acid producing germs during their passage through the long and tortuous small intestine, so that the remainder of the food is difficult of digestion in the large intestine. Another characteristic of the invention is that its presence in the large intestine in strong digestive power aids the digestion of any other food that may happen to be there at the same time, or soon after.

The composite food described in said Fowler applications for patent is self-preservative for long periods of time. The artificial buttermilk in powder or tablet form is self-preservative in form for effective vitality six months or more, and is entirely harmless after that time, although it may be less effective. Consequently it is entirely feasible, as a commercial proposition, to mix powdered artificial buttermilk with the other pulverized ingredients of the food after the drying operation thereof, with the result that the combination is self-preservative for a period of six months at least. A food is thus provided which can be made in factories on a large scale under unified expert supervision, and distributed through the regular and relatively slow channels of commerce to remote places. When eaten it is palatable and inviting to the taste. In the digestive tract it has associated with it, as an important part of the invention, elements which tend to bring about its complete digestion under circumstances where other prepared foods, heretofore proposed, have tended toward a state of only partial digestion, terminating in a state of putrefaction which is recognized as being on the whole disadvantageous.

In the specific form of the food composition above described the bran is the agent for stimulating peristalsis; but it is obvious that any medium which is not harmful and which is capable of producing the desired effect, might be substituted for that, important qualifications being that it should be capable of resisting solution and liquefaction at the ordinary temperatures of the blood, and of resisting digestion at least long enough to accomplish its object in the small intestine. Bran is a very convenient element for performing this function because it is derived naturally from cereal origin, is relatively inexpensive, and is known by everyone to be harmless. It is also to be observed that the composite food set forth in another application for patent of Mr. Fowler Serial No. 846,888 may be used as one ingredient in the present food, the composition disclosed in the last mentioned application for patent being distinguished from the other two disclosed by Mr. Fowler in that it embodies as an ingredient the proteid residue of whole milk, left by removal of the cream and water. This adapts itself particularly to use with the present invention, for when moisture is added to a food composition containing the lactic acid producing germs distributed throughout its mass, and the powdered milk residue, a culture medium is produced in which the activity of the germ life that until then has been held in quiescence can begin at once. It will further be understood that, in either of the foods mentioned as having been first disclosed by Mr. Fowler, various fruit and cereal components may be chosen and not merely those specified herein. While lactic acid producing germs have been specified herein as being preferable so far as my present knowledge goes, for the production of the desired acid in the large intestine, I have already pointed out that the activity of other acid-producing germs that may be already existing in the intestine will be stimulated by this method; and it would be merely another form or manifestation of the present discovery if some other sort of acid producing germ were substituted for the lactic acid producing germ and the artificial buttermilk which constitute the best embodiment of the invention of which I am aware at the present time. Bearing in mind these qualifications, it may further be stated that it is intended to cover by the appended claims whatever features of patentable novelty exist in the invention disclosed.

What is claimed is:

1. The combination of a finely comminuted, sterile and dry mass of food ingredients derived from fruit, cereal, the protein of milk separated from other natural components of milk, and artificial buttermilk in solid form, the said solid buttermilk including living lactic-acid-producing germs, and the combination also including peristalsis-stimulating bodies adapted to resist solution and liquefaction at normal blood temperature.

2. The combination of a finely comminuted, sterile and dry mass of food ingredients, including ingredients derived from fruit, cereal and artificial buttermilk, in solid form; the said solid buttermilk including living acid-producing germs, and the said cereal ingredient including bran.

3. The combination with a finely comminuted, sterile and dry mass of food ingredients, including ingredients derived from fruit and cereal, of a medium in solid form bearing living acid-producing germs adapted to act in the intestinal tract, there being included in the combination peristalsis-stimulating bodies adapted to resist solution and liquefaction at normal blood temperature.

4. The combination with a finely comminuted sterile and dry mass of food ingredients, including ingredients derived from fruit and cereal, of a peristalsis-stimulating substance and a medium bearing living acid-producing germs adapted to act in the intestinal tract.

5. The combination of a finely pulverized, sterilized and dried mass of food material of cereal and fruit origin, peristalsis-stimulating bodies adapted to resist solution and liquefaction at normal blood temperature, and a medium holding living germs, adapted to live on the material of the combination as a food and to produce acid in the human intestinal tract.

6. The combination of a medium bearing living germs adapted to produce acid in the human intestinal tract and food ingredients adapted to serve as human food and as a culture medium for the growth of said germs, and a peristalsis-stimulant adapted to accelerate the movement of the food, culture medium and living germs through the small intestine, thereby tending to introduce said germs into the large intestine in a state of active vitality.

Signed by me at Chautauqua, N. Y., this ninth day of June, 1914.

JAY W. SEAVER.

Witnesses:
ELLEN E. POWERS,
F. L. TERRY.